United States Patent [19]

Lehrman

[11] Patent Number: 5,702,075
[45] Date of Patent: Dec. 30, 1997

[54] AUTOMATICALLY COLLAPSIBLE SUPPORT FOR AN ELECTRICAL CORD FOR USE WITH AN IRONING BOARD

[75] Inventor: David Lehrman, 207 Barclay Cir., Cheltenham, Pa. 19012

[73] Assignee: David Lehrman, Philadelphia, Pa.

[21] Appl. No.: 595,010

[22] Filed: Jan. 31, 1996

[51] Int. Cl.$^6$ .................... D06F 81/00; F16L 3/00
[52] U.S. Cl. .................... 248/51; 248/52; 38/137
[58] Field of Search .................... 248/51, 52; 38/103, 38/104, 106, 108, 109

[56] References Cited

U.S. PATENT DOCUMENTS

| | | | |
|---|---|---|---|
| 1,027,479 | 5/1912 | Hoffine | 38/106 |
| 1,476,395 | 12/1923 | Davis | 248/51 |
| 2,144,272 | 1/1939 | Ray | 248/51 |
| 2,462,464 | 2/1949 | Brier et al. | 248/51 |
| 2,478,498 | 8/1949 | Myers | 248/117.4 |
| 2,546,589 | 3/1951 | Felts | 248/51 |
| 2,647,713 | 8/1953 | Wersching | 248/51 |
| 2,676,775 | 4/1954 | Schulz | 248/51 |
| 2,715,002 | 8/1955 | Davis | 248/51 |
| 2,716,531 | 8/1955 | Johnson | 248/51 |
| 2,979,296 | 4/1961 | Groocock | 248/51 |
| 3,250,030 | 5/1966 | LaPastora | 38/142 |
| 3,473,767 | 10/1969 | Schwaneke | 248/51 |
| 3,568,970 | 3/1971 | Mallett | 248/311 |
| 3,913,878 | 10/1975 | Wayne | 248/311 |
| 4,154,010 | 5/1979 | Evans | 38/106 |
| 4,535,921 | 8/1985 | Sanders | 223/106 |
| 4,910,896 | 3/1990 | Ruschitzka | 38/106 |
| 5,272,825 | 12/1993 | Simpson | 38/137 |
| 5,392,543 | 2/1995 | Lehrman | 38/140 |
| 5,472,157 | 12/1995 | Lehrman | 248/51 |

Primary Examiner—Ramon O. Ramirez
Assistant Examiner—Charles J. Hunter
Attorney, Agent, or Firm—Seidel Gonda Lavorgna & Monaco, PC

[57] ABSTRACT

An ironing table has an ironing board with a top surface, a vertical wall depending from the periphery of the top surface, and a bottom. The ironing board is adapted to receive an ironing board cover assembly over the top surface and the vertical wall. The ironing table has an apparatus having a mounting bracket and a cord support mast adapted to support an electrical cord of an electrical appliance. The apparatus is attached to the bottom of the ironing board with the mounting bracket, which in parts extends upward above the height of the top surface of the ironing board and which is spaced from the vertical wall of the ironing board. The cord support mast is in turn, supported by the mounting bracket, and has a cord receiving portion. The mounting portion has a lower support and a side support. The supports are hingedly connected to each other to enable the cord support to pivot between a raised position and a collapsed position. A biasing mechanism, such as a spring, coacts with the supports for biasing the cord support mast towards the collapsed position. The apparatus has a detent on latch for retaining the cord support mast in the raised position.

20 Claims, 5 Drawing Sheets

AUTOMATICALLY COLLAPSIBLE SUPPORT FOR AN ELECTRICAL CORD FOR USE WITH AN IRONING BOARD

FIELD OF THE INVENTION

This invention relates to a combination electrical cord support for supporting an electrical cord of an electrical appliance and an electrical outlet into which that cord may be plugged, and more particularly to a support that is automatically collapsible to a collapsed position and that is mounted to an ironing board.

BACKGROUND OF THE INVENTION

It is known to attach cord support devices to ironing boards for supporting the electrical cord of an electric iron so that the cord will not interfere with or be damaged by ironing. It is further known to incorporate on such cord support devices an outlet for receiving the plug at the end of the electrical cord which is supported by the cord support device. U.S. Pat. Nos. 2,478,498, 2,715,002 and 5,472,157 disclose such apparatus.

Typically such cord support devices are clamped to the ironing board of an ironing table. In order to store the ironing board, the cord support device must be removed or folded, or both, in order to store the ironing board. Such support devices can also interfere with the installation and removal of an ironing board cover. The cord support device must be removed or the conventional ironing board cover must be modified in order to accommodate the cord support devices.

It would be desirable to provide an electrical cord support apparatus which automatically collapses to facilitate storage of the ironing board.

It is further desired that the cord support apparatus be relatively permanently attached to the ironing board, but not interfere with the installation and replacement of an ironing board cover.

SUMMARY OF THE INVENTION

This invention relates to an apparatus carried by a structure such as an ironing table. The apparatus comprises a cord support mast adapted to support an electrical cord of an electrical appliance. The ironing table has an ironing board with a top surface, a vertical wall depending from the periphery of the top surface, and a bottom. The ironing board is adapted to receive an ironing board cover assembly over the top surface and the vertical wall. The apparatus is attached to the bottom of the ironing board with a mounting bracket, which in part extends upward above the height of the top surface of the ironing board and which is spaced from the vertical wall of the ironing board. The cord support mast is, in turn, supported by the mounting bracket, and has a cord receiving portion extending upward from the mounting bracket.

The mounting bracket has a lower support and a side support. The supports are hingedly connected to each other to enable the cord support to pivot between a raised position and a collapsed position. A biasing mechanism such as a spring, coacts with the supports for biasing the cord support mast towards the collapsed position. The apparatus has a detent or latch for retaining the cord support mast in the raised position.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, there is shown in the drawing, forms which are presently preferred; it being understood, however, that this invention is not limited to the precise arrangements and instrumentalities shown.

DETAILED DESCRIPTION OF THE INVENTION

Referring now to the drawings, wherein like numerals indicate like elements, there is illustrated one embodiment of a collapsible electrical cord support 10 in accordance with the present invention.

Figure 1:
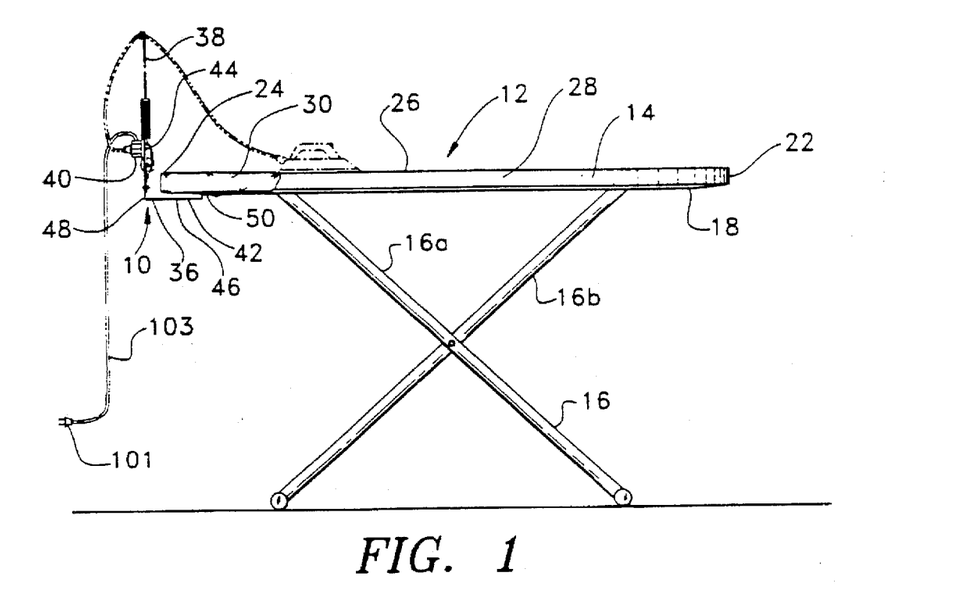
FIG. 1 a side view of one embodiment of a collapsible electrical cord support according to the invention, showing the cord support in a raised position, as it would be mounted to an ironing board, and with an iron shown in phantom.
Figure 2:
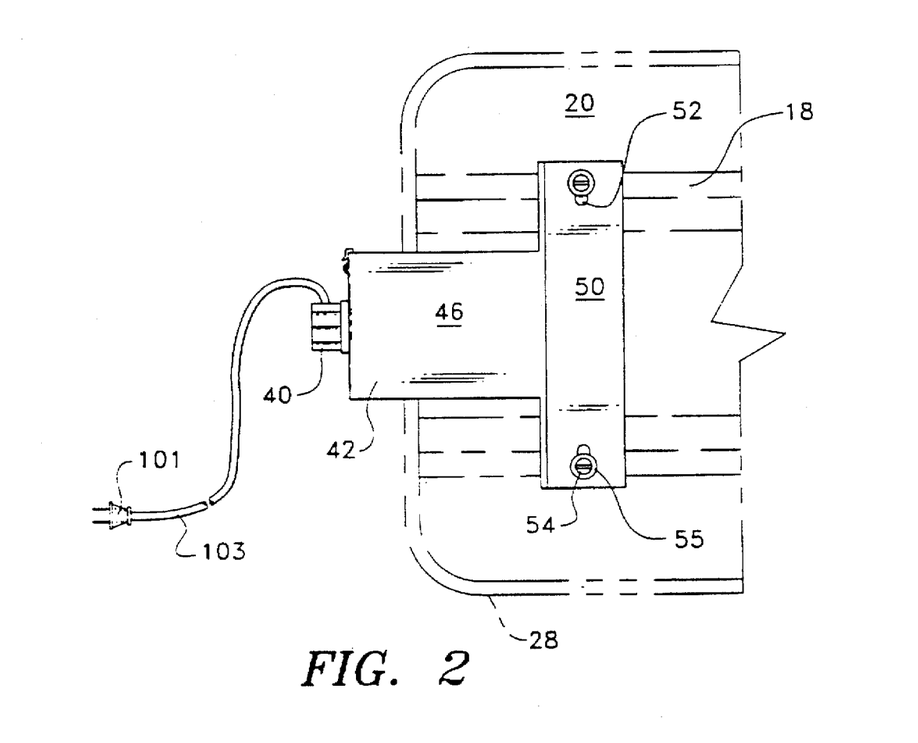
FIG. 2 is a bottom view of the collapsible electrical cord support of FIG. 1, mounted to an ironing board shown in phantom.

Referring to FIG. 1, an ironing table 12 of conventional construction has an ironing board 14 and a pair of folding legs 16. The ironing board 14 has a pair of support rails, also referred to as re-enforcing channels, 18 which extend longitudinally on the underside 20 of the ironing board 14, as best seen in FIG. 2. The support rails 18 extend from a tapered end of the ironing board 14, called the nose 22, to the other end, called the heel 24. One of the legs 16a is pivotably mounted to the support rails 18. The other leg 16b is pivotably connected to leg 16a and slides relative to the support rails 18 to raise and lower the ironing board 14 to a desired height.

The ironing board 14 comprises a top ironing surface 26 supported and stiffened by the support rails 18 as already noted, and a peripheral vertical wall 28 that extends downward from the edge of the ironing board 14. Vertical wall 28 has an inwardly turned lower edge 56, so that vertical wall 28 is substantially L-shaped in cross-section.

Still referring to FIG. 1, the ironing board 14 is illustrated as having installed thereon an ironing board cover 30. The ironing board cover 30, a portion of which is shown broken away in FIG. 1, comprises a web of material and a plurality of tensioning means such as flexible straps, not shown. An ironing pad may be located on the top surface 26 of the ironing board 14 for dissipating the heat of the iron and cushioning the iron. If used, the pad is preferably of conventional construction. The pad may be a separate piece attached to the underside of a fabric layer of the cover 30, or may be integral with the cover. My previously issued U.S. Pat. No. 5,392,543 describes an ironing board cover such as may be used with an ironing table or ironing board.

Collapsible electrical cord support 10 comprises a mounting bracket 36, a cord support mast 38, and a female electrical outlet 40. The mounting bracket 36 has a lower support arm 42 for attaching cord support 10 to the ironing board 14, and a side wall 44 to which the cord support mast 38 and the electrical outlet 40 are attached. The lower support arm 42 has generally an "L" shape. The lower support arm 42 has a generally "T" shaped portion 46 and an upstanding side wall 48 integral therewith. The "T" shaped portion 46 terminates at one end in a flange 50 which is wider than the width of the remainder of the base portion 46.

The flange 50 has a pair of slots 52 at the edges. Each slot 52 is adapted to receive a fastener, such as a screw 54. The screws 54 are threaded into tapped holes, not shown, in the support rails 18, in order to fasten lower support arm 42 to the underside of ironing board 14. Washers 55 are interposed between the flange 50 and the heads of the screws 54. In a preferred embodiment, bottom support arm 42 is approximately 3 inches wide and ⅜ inch thick and is made of metal, although it is recognized that the lower support arm 42 could be made from other materials, such as plastic.

Figure 3:
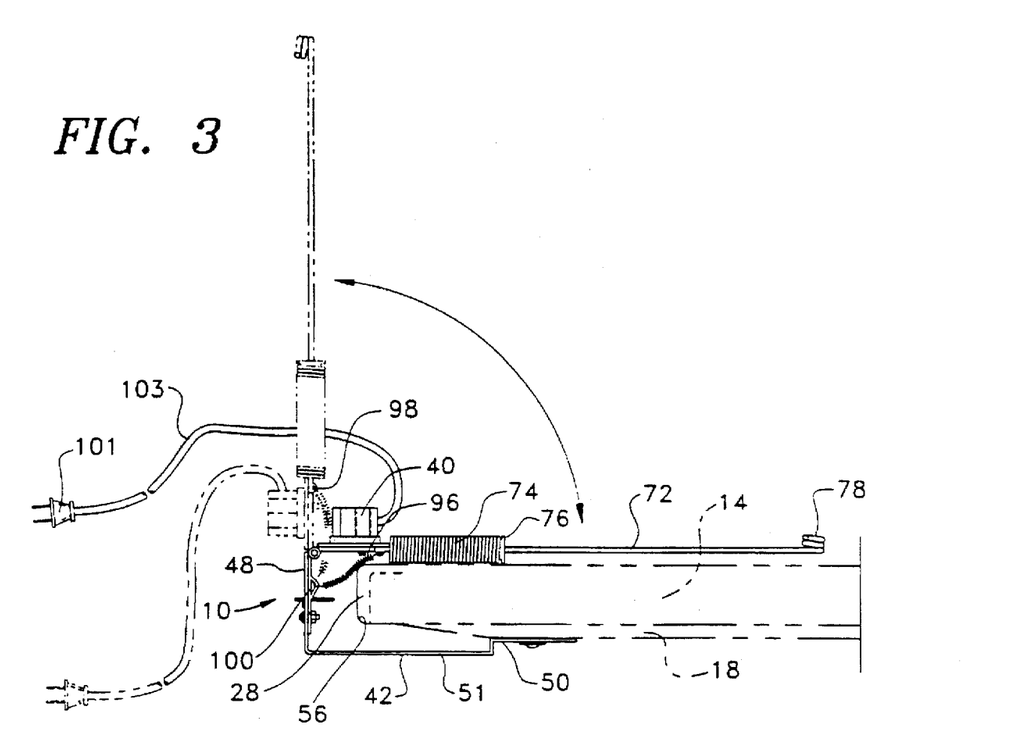
FIG. 3 is a side view of the collapsible electrical cord support of FIG. 1, shown in its collapsed position. The cord support is shown in the raised position in phantom.

As shown in FIG. 3, "T" shaped portion 46 of the lower support arm 42 has a stepped portion 51 spaced from a lower edge 56 of the vertical wall 28 by the depth of the flange 50. In a preferred embodiment, the stepped portion 51 of the base portion 46 is spaced from the lower edge 56 of the vertical wall 28 by ¾ of an inch. The upstanding side wall 48 of the lower support arm 42 projects upward from the base portion 46 and is spaced from the vertical wall 28 of the ironing board 14. In a preferred embodiment, the upstanding side wall 48 is spaced ¾ of an inch from the vertical wall 28.

Because the stepped portion 51 of base portion 46 is spaced from the vertical wall 28 of the ironing board 14 by the depth of the flange 50, the iron board cover 30, as shown in FIG. 1, can be installed on the ironing table 14 without interference with the collapsible electrical cord support 10.

Figure 4:
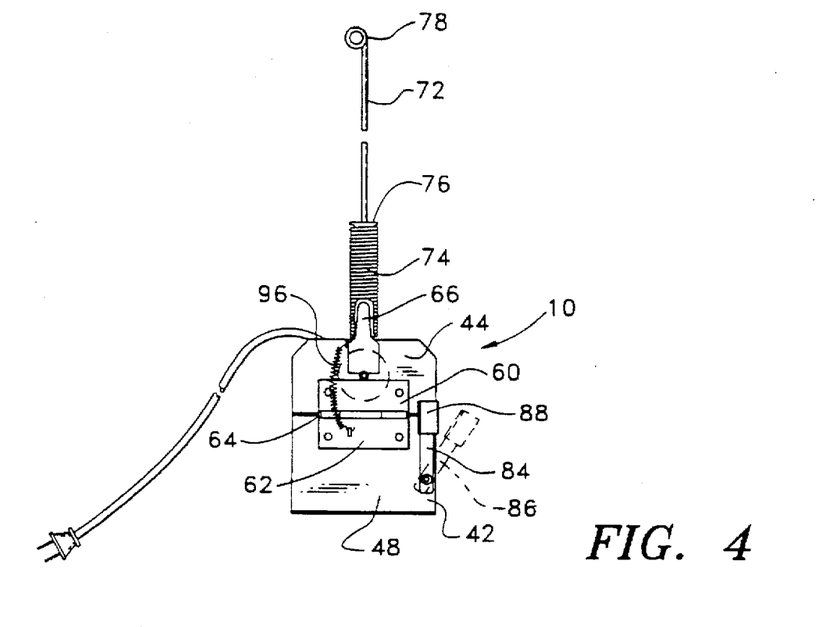
FIG. 4 is a front view of a portion of the collapsible electrical cord support of FIG. 1.
Figure 5:
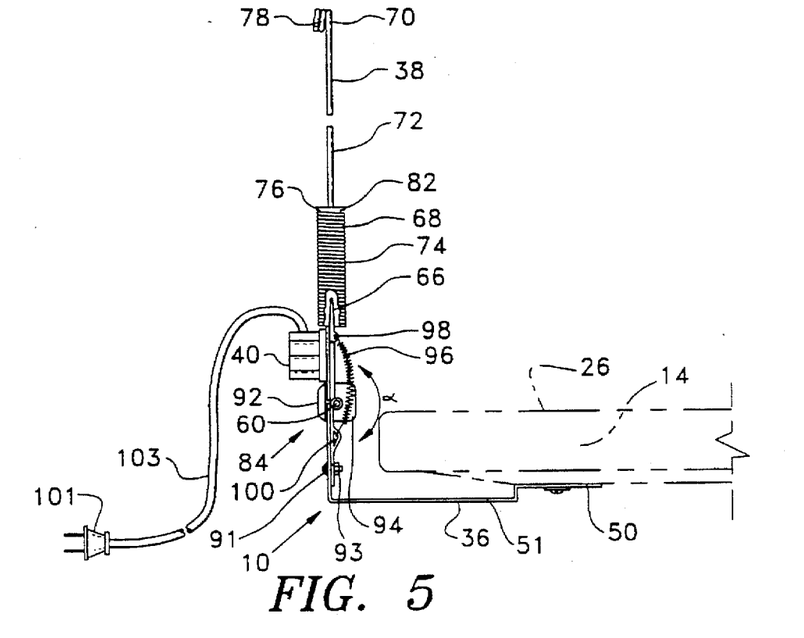
FIG. 5 is a side view of the collapsible electrical cord support of FIG. 1, mounted to the ironing board shown in phantom.

Referring to FIG. 4, side wall 44 is pivotably connected to upstanding side wall 48 of the lower support arm 42 by a hinge 60. The hinge 60 has a pair of leaves 62 with barrels and a pivot pin 64 therethrough, in conventional manner. Each of the leaves 62 is secured to a respective one of side walls 44 and 48. The hinge 60 allows the side wall 44 to pivot relative to the side wall 48 between a raised position where the angle α between the two side walls is approximately 180°, as seen in FIG. 5, and a collapsed, or retracted, position where the angle α is approximately 90°. The angle α may, in the collapsed position of cord support 10, be slightly less than 90°, e.g., 88°. In a preferred embodiment, the hinge limits movement in the raised position. The cord support mast 38 engaging the top surface 26 of the ironing table 14, not the hinge 60, limits the movement in the collapsed position.

Referring to FIGS. 4 and 5, the side wall 44 has a finger 66 which projects upward for receiving the cord support mast 38. The cord support mast 38 is partially broken away in FIGS. 4 and 5 to show the finger 66. The cord support mast 38 has a flexible portion 68 at one end which is attached to the finger 66, and a cord receiving portion 70 at the other end to receive an electrical cord. In a preferred embodiment, the cord support mast 38 comprises a rod portion 72 attached to side wall 44 through a resilient portion 74. Resilient portion 74 may comprise a coiled spring. The resilient portion 74 includes a cap 76 at its upper end for receiving one end of the rod 72. The lower end of the rod 72 is received by a hole, not shown, in the cap 76. The cap 76 has a shoulder 82 which engages the top of the coiled resilient spring 74.

The opposite end of rod 72 has a helically bent portion 78. The helically bent portion 78 comprises several turns, each turn axially spaced apart a short distance so as to define recesses for receiving the electrical cord from the electrical appliance, such as the iron, shown in FIG. 1. Thus, cord support mast 38 supports the electrical cord above the top ironing surface, 26 of the ironing board 14.

In a preferred embodiment, the rod is approximately 21½ inches long and the coiled resilient spring 74 is approximately 2 inches in length.

Figure 6:
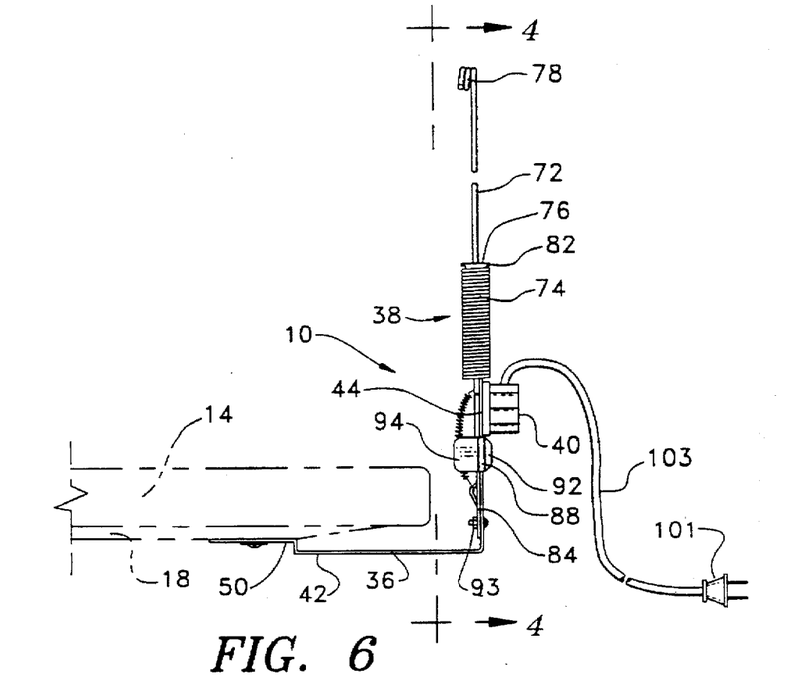
FIG. 6 is a side view of the collapsible electrical cord support of FIG. 1, mounted to the ironing board shown in phantom, seen from the side opposite that shown in FIG. 5.

Referring to FIGS. 4 and 6, the collapsible electrical cord support 10 has a detent mechanism, such as a friction latch 84. The latch 84 is pivotably mounted to side wall 48 of the lower support arm 42 for movement between a latched position and an unlatched position. The latch has an arm 86 which extends from a pivot point and terminates in a "U" shaped clip portion 88. The clip portion 88 comprises opposed plates which defines a slot for engaging and frictionally retaining the side wall 44 when the latch 84 is in the latched position. The frictional engagement between clip portion 88 and side wall 44 serves to retain the cord support mast 38 in the raised position. The latch 84 further comprises an outwardly extending flange 92, as best seen in FIG. 6, which projects from the clip portion 88. When the latch 84 moves towards the latched position, the outwardly extending flange 92 facilitates latching by engaging the side wall 44 and moving the plates apart to receive the side wall 44. The latch 84 has a handle 94 which projects from the clip portion 88 from the edge opposite the outwardly extending flange 92, for facilitating movement of the latch 84.

Figure 9:
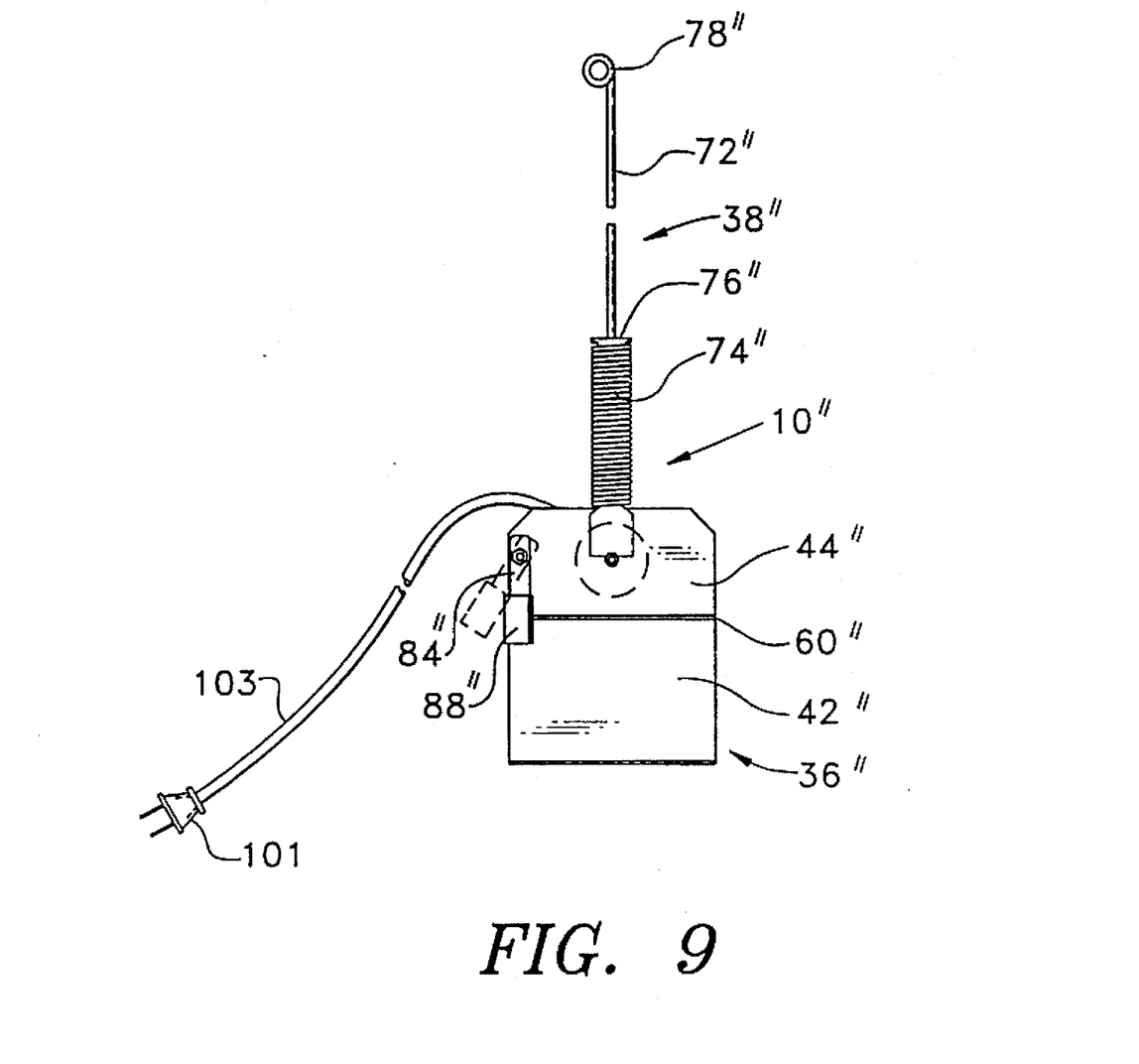
FIG. 9 is a front view of a portion of a third embodiment of the collapsible electrical cord support of the invention.

In a preferred embodiment, the latch 84 is pivotably mounted to side wall 42 by a bolt 91 and nut 93. The bolt 91 extends through a hole in both the latch 84 and the upper projecting portion 48 of the lower support 42. It is recognized that latch 84" could be mounted to the upper support 44 and engage the lower support 42, as seen in FIG. 9. Other detent mechanisms could also be used.

The collapsible electrical cord support 10 is held in the upright position by latch 84 against the force of a biasing means, such as a spring 96, which biases the side wall 44 and the cord support mast 38 towards the retracted position shown in FIG. 4. In the illustrated embodiment, the spring 96 extends from a hole 98 in the finger 66 to a bight 100 formed by a struck-out portion of the leaf 62 of hinge 60 which is secured to side wall 42.

The female electrical outlet 40 is secured to the side wall 44, such as by screw 102, and receives the plug from an iron, as shown in phantom in FIG. 1. The electrical outlet 40 is energized via an electrical cord 103 having a plug 101 at one end. Plug 101 may be plugged into a wall outlet. The electrical outlet 40 is shown on the side wall 44 in the FIGURES. However, the outlet 40 could be placed in other locations, such as side wall 48 of the lower support arm 42. The socket may face either inboard or outboard relative to the ironing board 14, as desired.

Figure 7:
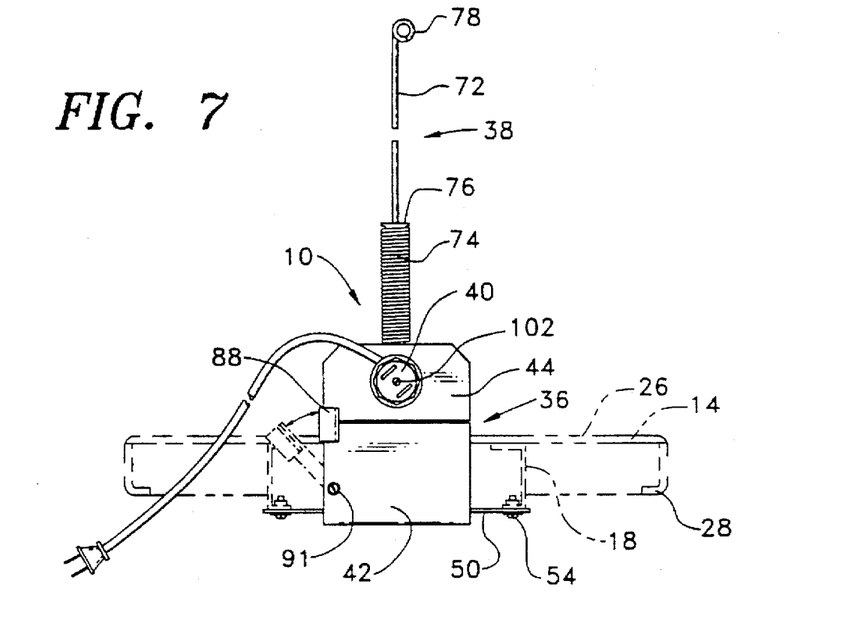
FIG. 7 is a rear view of the collapsible electrical cord support of FIG. 1.

When a person wants to use the ironing table 12, the user opens the ironing table 12 in the conventional manner. The user then rotates cord support 38 from the retracted position to the raised position against the force of spring 96. The user then rotates the latch 84 using the handle 94, so that the slot defined by the clip portion 88 frictionally engages the side wall 44 of the mounting bracket. The outwardly extending flange 92 assist in plates of the "U" shaped clip portion 88 apart in order to receive the side wall 44. Engagement of latch 84 with the side wall 44 retains latch 84 in the latched portion and retains the cord support 38 in the raised position, as seen in FIGS. 3 and 7.

The electrical cord of the iron is placed in the helically bent portion 78 of the cord receiving portion 70, as seen in phantom in FIG. 1, by placing the cord between the axially spaced turns. The electrical cord of the iron can be plugged into the female electrical outlet 40.

When ironing is completed, after the iron is stored, the user can release the latch 84 from the latched position and move it to the unlatched position by use of the handle 94. The spring 96 urges the cord support 38 to the retracted position, thus automatically collapsing the electrical cord support against the top surface of ironing board 14. The ironing table 12 is then collapsed in conventional manner for storage.

If the ironing board cover 30 needs to be removed for replacement or cleaning, the cord support 38 is placed in the raised position. Because the upstanding side wall 48 of the support arm 42 extends outboard of the vertical wall 28 of the ironing board 14 and the stepped portion 51 of the support arm 42 is spaced below the lower edge 56 of the vertical wall 28 enough to not to interfere with the lower edge 56 of the ironing board 14, the ironing board cover assembly 30 can be removed and reinstalled in a conventional manner without interference from the collapsible electrical cord support 10 including the T-shaped portion 46 of the lower support arm 42.

Figure 8:
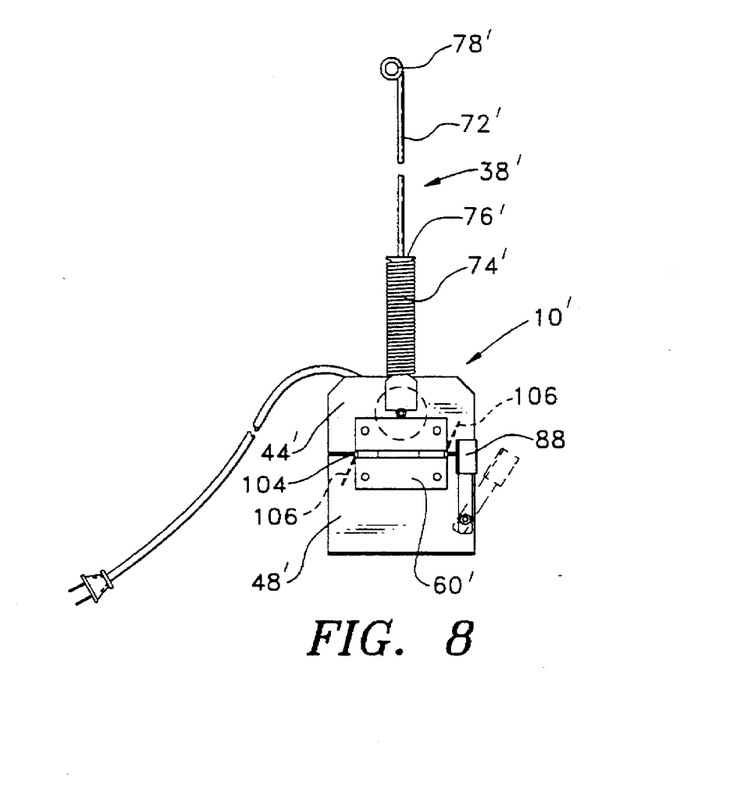
FIG. 8 is a front view of a portion of an alternate embodiment of the collapsible electrical cord support of the invention.

The collapsible electrical cord support may have other configurations and details without departing from the scope of the invention. For example, FIG. 8 shows a cord support 10' which has an alternative biasing means for urging side wall 44' and the cord support mast 38' towards the retracted position. The collapsible electrical cord support 10' shown in FIG. 8 has a torsional spring 104 which is formed as a single unit with the hinge 60'. The torsional spring 104 encircles the pin 64' of the hinge 60' and has a pair of arms 106. Each arm 106 engages one of the side walls 44' and 48, and urges wall 44' toward the collapsed position.

A collapsible electrical cord support 10" having a further alternative hinge and biasing element is shown in FIG. 9. The side walls 42" and 44" of the mounting portion 36" are formed from a single piece of material, such as a plastic. The mounting portion 36" has a thinned portion between the support arms 42' and 42.'. to form a hinge 60". The hinge 60" is formed such that the material of the hinge, such as a plastic, is biased towards the collapsed position. The plastic could be formed to have a "memory" to return the collapsed position. It is recognized that the hinge could also be formed from a spring steel or other metal which is formed such that the hinge is biased to urge the cord support 38 towards the collapsed position.

While the invention is disclosed with a conventional ironing table 12 having legs, it is recognized that the collapsible electrical cord support 10 could be used with other styles of ironing boards, including over-the-door ironing boards, and table top ironing boards.

The present invention may be embodied in other specific forms without departing from the spirit or essential attributes thereof and, accordingly, reference should be made to the appended claims, rather than to the foregoing specification, as indicating the scope of the invention.

I claim:

1. A cord support adapted to be carried by a structure, the cord support comprising:
   a mounting bracket having a support arm adapted to be secured to the structure, a first upstanding side wall segment, and a second upstanding side wall segment being pivotably connected to the first upstanding side wall segment for movement between a raised position wherein the first and second side wall segments are substantially coplanar with respect to each other and a collapsed position wherein the first and second side wall segments are substantially perpendicular to each other;
   a support mast carried by the second side wall segment and extending therefrom, the support mast having a cord receiving portion;
   a biasing element acting against at least the second side wall segment for biasing the second side wall segment and the support mast carried thereon towards the collapsed position; and
   a detent for retaining the second side wall segment and the support mast in the raised position.

2. A cord support as in claim 1, further comprising an electrical outlet on the mounting bracket for receiving a plug on the electrical cord of an electrical appliance.

3. A cord support as in claim 1, wherein the biasing element is a tension spring.

4. A cord support as in claim 1, wherein the detent is a latch pivotably mounted to one of the side support and support arm, and has a "U" shaped clip portion for engaging the other of the side support and support arm.

5. An ironing table comprising:
   an ironing board with a top surface, a vertical wall depending downward from the periphery of the top surface, and a bottom, the ironing board adapted to receive an ironing board cover assembly over the top surface and the vertical wall;
   a cord support apparatus having a mounting bracket and a cord support mast adapted to support an electrical cord of an electrical appliance, the cord support apparatus being attached to the bottom of the ironing board;
   the mounting bracket having a portion extending upward above the height of the top surface of the ironing board and being spaced from the vertical wall and from the bottom in a region in proximity to the vertical wall of the ironing board;
   the mounting bracket having a support arm and a side support carrying the cord support mast, the support arm and side support being hingedly connected to each other for enabling the cord support mast to pivot between a raised position with respect to the ironing board and a collapsed position with respect to the ironing board;
   a biasing element acting against at least the side support for biasing the cord support mast carried thereon towards the collapsed position; and
   a detent for retaining the side support and the cord support mast in the raised position.

6. An ironing table as in claim 5, wherein the biasing element is a tension spring.

7. An ironing table as in claim 6, wherein the detent is a latch pivotably mounted to one of the support arm and the side support clip portion for engaging the other of the side support and support arm.

8. An ironing table as in claim 7, wherein the cord support apparatus further comprises an electrical outlet on the mounting bracket for receiving a plug on the electrical cord of an electrical appliance.

9. An ironing table as in claim 8, wherein the cord support mast is joined to the side support by a resilient spring section.

10. In combination, an ironing board having a top, a bottom, and a side edge, and a cord support attached thereto for supporting an electrical cord of an iron, the cord support comprising (i) a mounting bracket having a support arm attached to the bottom of the ironing board, the mounting bracket being shaped to follow the contour of the bottom and side edge of the ironing board while remaining spaced therefrom and having a vertical side portion which extends above the top of the ironing board, the side portion being connected to the mounting bracket by a pivot, (ii) a cord support mast on the side portion, (iii) a biasing element for biasing the side portion and cord support mast to a position in which the mast lies substantially parallel to the top of the ironing board, and (iv) a releasable latch engaging the side portion for retaining the side portion and cord support mast in a position in which the mast is at approximately perpendicular to the top of the ironing board.

11. An ironing table comprising:

an ironing board with a top surface, a vertical wall depending downward from the periphery of the top surface, and a bottom, the ironing board adapted to receive an ironing board cover assembly over the top surface and the vertical wall;

a cord support apparatus having a mounting bracket and a cord support mast adapted to support an electrical cord of an electrical appliance, the cord support apparatus being attached to the ironing board by the mounting bracket;

the mounting bracket having a support arm and a side support carrying the cord support mast, the support arm and side support being hingedly connected to each other for enabling the cord support mast to pivot between a raised position with respect to the ironing board and a collapsed position with respect to the ironing board;

a biasing element acting against at least the side support for biasing the cord support mast carried thereon towards the collapsed position; and a detent for retaining the side support and the cord support mast in the raised position.

12. An ironing table as in claim 11, wherein a portion of the mounting bracket is spaced from the bottom of the ironing board and the vertical wall.

13. An ironing table as in claim 11, wherein the apparatus further comprising an electrical outlet on the mounting bracket for receiving a plug on the electrical cord of an electrical appliance.

14. An ironing table as in claim 11, wherein the biasing element is a tension spring.

15. An ironing table as in claim 11, wherein the biasing element is a torsional spring.

16. An ironing table as in claim 11, wherein the detent is a latch pivotably mounted to one of the support arm and the side support, and has a "U" shaped clip portion for engaging the other of the side support and support arm.

17. A cord support adapted to be carried by a structure, the cord support comprising:

(a) a mounting bracket having a support arm adapted to be secured to the structure and a side support extending from the support arm, the side support being pivotably connected to the support arm for movement between a raised position and a collapsed position;

(b) a cord support mast carried by the side support and extending therefrom;

(c) a biasing element for biasing the side support and the support mast carried thereon towards the collapsed position; and (d) a detent for retaining the side support and the support mast in the raised position, wherein the detent is a latch pivotably mounted to one of the side support and support arm, and has a "U" shaped clip portion for engaging the other of the side support and support arm.

18. An ironing table comprising:

(a) an ironing board with a top surface, a vertical wall depending downward from the periphery of the top surface, and a bottom, the ironing board adapted to receive an ironing board cover assembly over the top surface and the vertical wall;

(b) a mounting bracket having a support arm adapted to be secured to the structure and a side support extending from the support arm, the side support being pivotably connected to the support arm for movement between a raised position and a collapsed position;

(c) a support mast carried by the side support and extending therefrom, the support mast having a cord receiving portion;

(d) a biasing element for biasing the side support and the support mast carried thereon towards the collapsed position; and (e) a detent for retaining the side support and the support mast in the raised position, wherein the detent is a latch pivotably mounted to one of the side support and support arm, and has a "U" shaped clip portion for engaging the other of the side support and support arm.

19. An ironing table comprising:

(a) an ironing board with a top surface, a vertical wall depending downward from the periphery of the top surface, and a bottom, the ironing board adapted to receive an ironing board cover assembly over the top surface and the vertical wall;

(b) a mounting bracket having a support arm adapted to be secured to the structure and a side support extending from the support arm, the side support being pivotably connected to the support arm for movement between a raised position and a collapsed position;

(c) a support mast carried by the side support and extending therefrom, the support mast having a cord receiving portion;

(d) a tension spring having first and second ends, the first end being attached to the support arm, the second end being attached to the side support, whereby the tension spring biases the support arm towards the collapsed position; and (e) a detent for retaining the side support and the support mast in the raised position.

20. An ironing table comprising:

(a) an ironing board with a top surface, a vertical wall depending downward from the periphery of the top surface, and a bottom, the ironing board adapted to receive an ironing board cover assembly over the top surface and the vertical wall;

(b) a mounting bracket having a support arm adapted to be secured to the structure, a side support extending from the support arm, and an electrical outlet for receiving a plug on the electrical cord of an electrical appliance, the side support being pivotably connected to the support arm for movement between a raised position and a collapsed position;

(c) a support mast carried by the side support and extending therefrom, the support mast having a cord receiving portion;

(d) a biasing element for biasing the side support and the support mast carried thereon towards the collapsed position; and (e) a detent for retaining the side support and the support mast in the raised position.

* * * * *